June 1, 1965     H. LITTMANN     3,186,300
DOUBLE STEREO-MICROSCOPE AND ILLUMINATOR FOR SURGICAL OPERATIONS
Filed July 13, 1961     4 Sheets-Sheet 1

INVENTOR:
Hans Littmann
BY Singer, Stern & Carlberg
Attorneys.

June 1, 1965 H. LITTMANN 3,186,300
DOUBLE STEREO-MICROSCOPE AND ILLUMINATOR FOR SURGICAL OPERATIONS
Filed July 13, 1961 4 Sheets-Sheet 4

INVENTOR:
Hans Littmann,
BY Singer, Stern & Carlberg
Attorneys.

United States Patent Office 3,186,300
Patented June 1, 1965

3,186,300
DOUBLE STEREO-MICROSCOPE AND ILLUMINATOR FOR SURGICAL OPERATIONS
Hans Littmann, Heidenheim an der Brenz, Germany, assignor to Carl Zeiss, Oberkochen, Wurttemberg, Germany
Filed July 13, 1961, Ser. No. 123,741
Claims priority, application Germany, Mar. 4, 1961, Z 8,590
3 Claims. (Cl. 88—39)

The invention relates to stereo-microscopes used in operative surgery, and is particularly directed to a double stereo-microscope which permits a surgeon and his assistant to view stereoscopically the organs to be operated on and the instruments employed for this purpose. A close mounting of the stereo tubes and their immediate focussing upon the center of the operating field is, however, not possible when for instance the width of the operating table requires a greater distance between the surgeon and his assistant.

It is therefore an object of the invention to provide a double stereo-microscope having a common supporting arm which is coarsely adjustable particularly in its height and whose length conforms approximately to the width of the operating table. The two ends of this supporting arm are each provided with a pair of stereotubes and with means for fine adjustment of the same. The supporting arm has also attached thereto an illumination means according to the Kohler's principle and arranged between the stereotubes, and an arrangement of reflectors positioned symmetrically between the stereotubes, by means of which reflectors the extended axial rays of the stereotubes are united at a point of the object plane.

Another object of the invention is to arrange the two pairs of stereotubes at the ends of their common carrier in such a manner that the axes of the objectives are directed parallel. In such a case the objectives cooperate with 45° reflectors which deflect the observation rays rectangularly and reflect them to an intermediate symmetrically arranged pair of reflectors which unite these observation rays at one point of the object plane. The illumination arrangement provided between the stereotubes is housed in a tube which is arranged parallel to the stereotubes, and the observation rays are reflected into the image producing path of rays by means of auxiliary reflectors and the 45° reflectors pertaining to the microscopic objectives. For reasons of safety it may be advisable to provide two illumination arrangements which can be switched on and off separately and which are both arranged parallel to the stereotubes.

It is another object of the invention to arrange the stereotubes inclined to one another. In such a case the objectives are provided with an arrangement of reflectors symmetrically positioned between the objectives, by means of which reflectors the observation rays are united immediately at one point of the object plane. Also the illumination rays emitted by the illumination arrangement, which is positioned between the stereotubes, are then immediately reflected by these reflectors into the path of the observation rays. In this embodiment of the invention it may also be advisable to provide two illumination arrangements which can be switched on and off independently and which are housed in tubes that are directed parallel to the inclined stereotubes.

The invention will now be described in greater detail with reference to the accompanying drawings which illustrate by way of example two embodiments of the invention.

Figure 1:
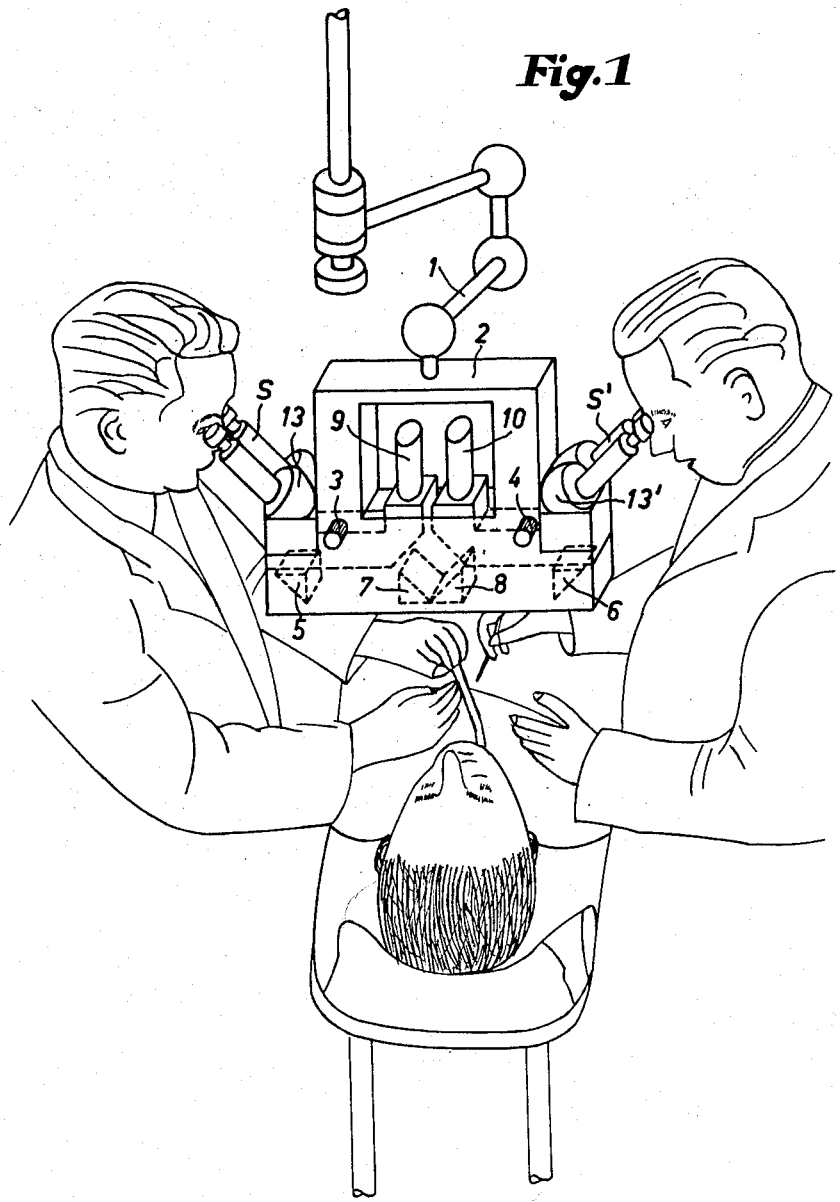
FIG. 1 illustrates diagrammatically one embodiment of the double stereo-microscope.

Referring to FIG. 1, a substantially horizontal supporting arm 1 is coarsely adjustable in its height and swingable in all directions and has attached to one of its two ends the supporting body 2 of the instrument whose largest extension corresponds approximately to the width of the operating table. The supporting body 2 has coupled to both its ends by fine adjusting means 3 and 4 a pair of inclined microscopic stereotubes S and S' the optical axes of which are directed perpendicularly to the field of operation. The objectives 13 and 13' of the stereotubes S and S' respectively are associated with the 45° reflectors 5 and 6 which deflect the observation rays rectangularly and pass them on to a centrally positioned arrangement of reflectors 7 and 8 which combine and centralize the rays over the field of operation. Between the pairs of stereotubes S and S' are arranged two vertical tubes 9 and 10 for accommodating the illumination means. The illuminating rays emitted by the illumination means in these tubes 9 and 10 are reflected by auxiliary prisms 16 and 16' as well as the prisms 17 and 17' (see FIG. 2) and the 45°-reflectors 5 and 6 into the path of the observation rays.

Figure 2:
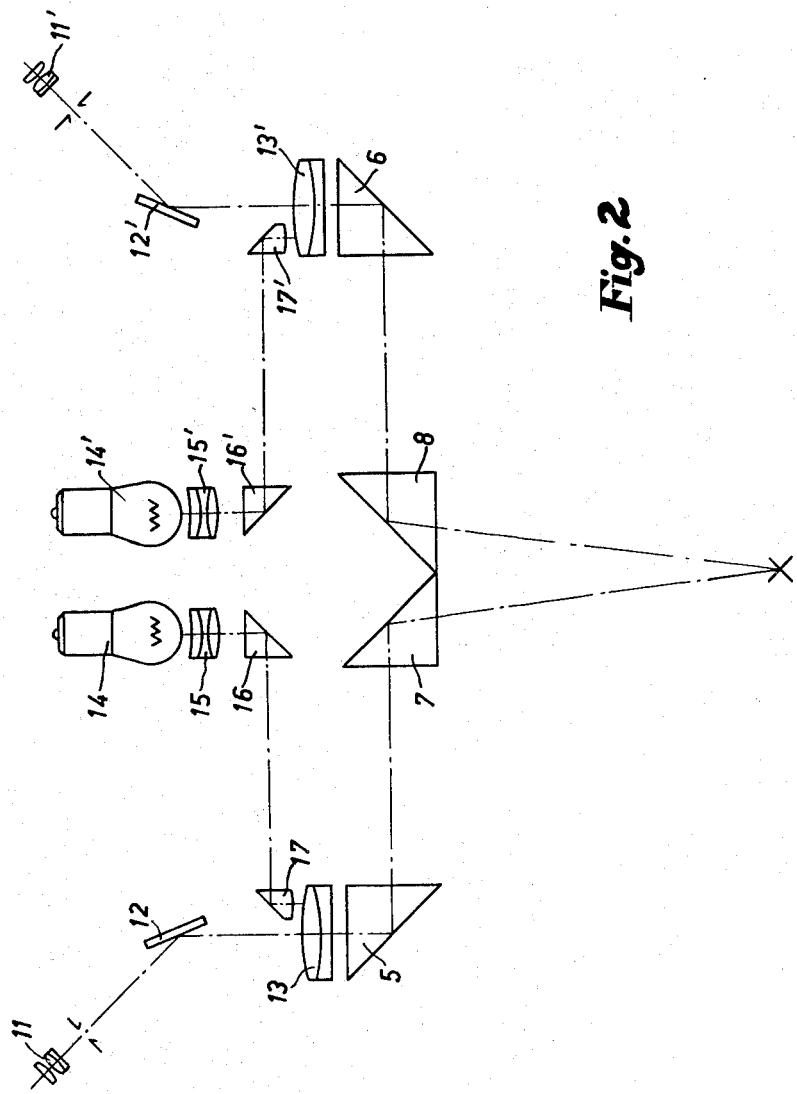
FIG. 2 illustrates the optical equipment and the path of the light rays through the same.

FIG. 2 illustrates the course of the rays. The stereotubes S and S' with the oculars 11 and 11', the inversion reflectors 12 and 12', and the objectives 13 and 13' are coordinated with the 45° reflectors 5 and 6 by which the rays coming from the stereotubes S and S', after having been deflected rectangularly, are caused to converge and by means of the centrally positioned reflector combination 7, 8 are united at one point of the object plane. The sources of light 14 and 14' with the illuminating lenses 15 and 15' are coordinated with the auxiliary reflectors 16, 17 and 16', 17' respectively, by means of which the illumination rays are reflected into the path of the observation rays and produce a sharply defined field in the object plane.

Figure 3:
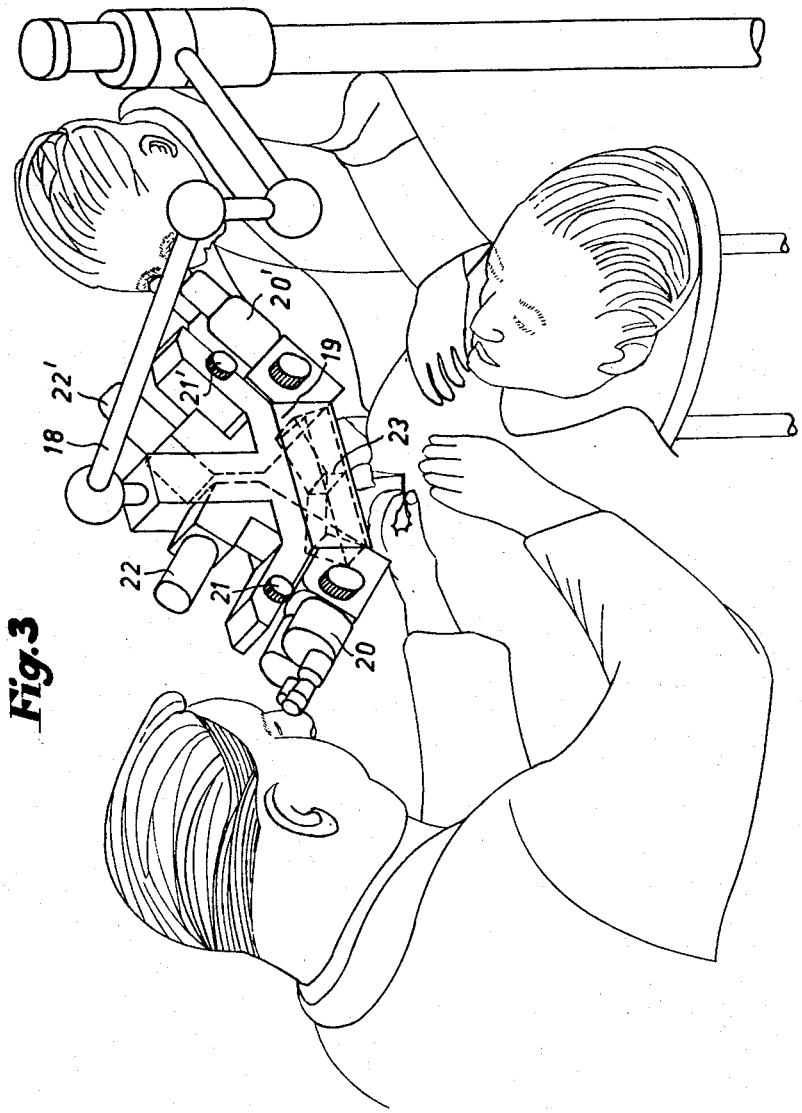
FIG. 3 illustrates diagrammatically the second embodiment of the stereo-microscope.

FIG. 3 illustrates a similar double-microscopic arrangement in which, however, the stereotubes 20 and 20' and the illumination means arranged in tubes 22 and 22' directed parallel thereto are inclined toward each other. The supporting arm 18, which is coarsely adjustable in its height and is swingable in all directions, has mounted thereon the instrument carrier 19 which combines the two inclined pairs of stereotubes 20 and 20' to one coarsely adjustable unit. The stereotubes 20 and 20' are finely adjusted independently from one another by the knurled knobs 21 and 21' and toothed rack bars. Parallel to the stereotubes 20, 20' are arranged the tubes 22 and 22' containing the illuminating means. The path of the rays to be explained hereinafter which leave together the objectives of the stereotubes 20, 20' is conducted by means of a reflector combination 23, which is symmetrically arranged between the objectives, to the object plane where the extended axial rays of the observation rays are united and where the illumination rays produce a sharply defined luminous field.

Figure 4:
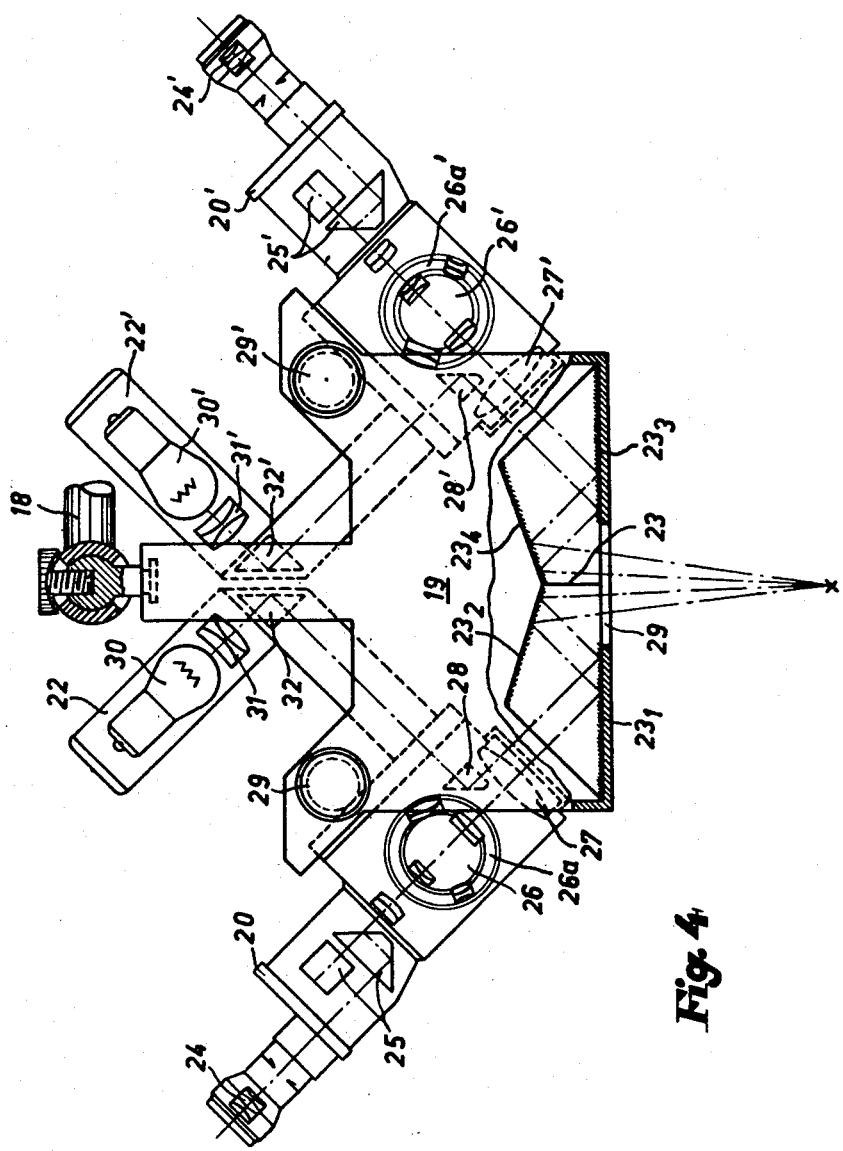
FIG. 4 illustrates the optical equipment and the path of the light rays through said second embodiment.

FIG. 4 illustrates diagrammatically the paths of the individual light beams. This cross-sectional view passes through the center of the stereotubes 20, 20' in the foreground which are the left hand tubes in FIG. 3. The carrier 19 containing the instrument parts is suspended from the coarsely adjustable supporting arm 18. Each one of the stereotubes 20, 20' comprises the following optical elements: The oculars 24, 24', a pair of inversion prisms 25, 25', a group of rotatably switchable lenses 26, 26' on a rotatable magnification changer 26a and 26a', the objectives 27, 27', and the prisms 28, 28' for reflecting the illumination rays. The faces of the prisms 28 and 28' facing the objectives are spherical. The pairs of stereotubes 20, 20' are coupled to the supporting arm 19 by fine adjusting means. The stereotubes 20, 20' can be adjusted independently from one another by means of the knurled knobs 29 and 29'. Between the objectives 27, 27' is symmetrically arranged a combination of reflectors $23_1$, $23_2$, $23_3$ and $23_4$ which are associated with two glass prisms cemented together.

The reflecting surfaces $23_1$ to $23_4$ consist of mirror coatings and a central aperture 29 is left open for the passage of the observation rays. As schematically illustrated, the axial light rays passing through the objectives 27, 27' are united at one point of the object plane after having been reflected twice. The two stereotube pairs 20, 20' are each connected with an illuminating arrangement disposed within rectangularly bent tubes 22, 22' respectively. The rays emitted from the light sources 30, 30' are collected by the condensers 31, 31' and after having been deflected by the prisms 32, 32' are reflected into the path of the observation rays by the prisms 28, 28' whose exit surfaces are spherical. The illumination rays also pass by means of the reflector combination $23_1$ to $23_4$ through the aperture 29 on to the object plane where they produce a sharply delimited luminous field.

What I claim is:

1. In an optical instrument for surgical use adapted to be positioned above a surgical table to view and magnify a patient's operation from both sides of said table, support means, a supporting housing carried by said support means of a width and length to extend laterally of said table, said housing being provided with a central opening, a pair of stereo magnification tubes slidably and adjustably mounted on each end of said supporting housing, said tubes each being provided at their upper ends with an ocular and being arranged at an obtuse angle with respect to the ends of said supporting housing, an objective in each of said ends of the supporting housing and movable with the magnification tubes, prism means mounted in said supporting housing above said opening and having oppositely arranged upwardly divergent reflecting surfaces for directing image rays in both directions toward said stereo tubes, a pair of light sources supported on said supporting body, an illumination lens for each light source, reflecting prisms mounted adjacent said stereo tubes for reflecting light rays from said light sources downwardly in the housing, an additional reflecting prism mounted adjacent each end of housing for directing rays of light inwardly of said housing toward said first named prism means and through said opening in the lower portion of said supporting housing.

2. In an optical instrument for surgical use adapted to be positioned above a surgical table to view and magnify a patient's operation from both sides of said table, support means, a housing supported by said support means equal in length to the width of said table, said housing being provided with a central opening, a pair of stereo magnification tubes slidably and adjustably mounted on each end of said housing, there being an objective in each of the ends of the supporting housing and movable with the magnification tubes, an ocular on the upper end of each tube, said tubes being arranged to extend at an inclined angle with respect to said housing, a pair of reflecting prisms mounted in the lower portion of said housing above the opening therein having oppositely arranged upwardly divergent reflecting surfaces for reflecting image rays passing upwardly through said opening from the operation and outwardly toward the objective lenses of said stereo magnification tubes, a light source for each of said stereo magnification tubes, an illumination prism adjacent each of said objectives for directing rays of light parallel to the tube axis of the corresponding magnification tubes, reflecting prisms adjacent each of said light sources for directing the light ray laterally toward the illumination prisms adjacent said stereo magnification tubes at each end of the housing, and reflecting prisms mounted in said tubes for directing a ray of light through said pair of reflecting prisms and through said opening in the lower portion of said housing to illuminate said operation.

3. In an optical instrument for surgical use adapted to be positioned above a surgical table to view a patient's operation under magnification from both sides of said table, support means, a housing carried by said support means, said housing being of a length substantially equal to the width of said operating table and having a central opening in its lower wall, a pair of binocular type optical instruments slidably mounted adjacent each end of said housing and inclined with respect thereto and with their optical axes intersecting, a pair of reflecting prism elements each having vertical plane surfaces cemented together along a central common vertical plane, said prism elements each having lower reflecting surfaces forming a common base face having a clear central area, each of said prism elements being provided with an inclined reflecting prism face disposed opposite said common base face forming upwardly divergent reflecting surfaces with respect to the central vertical cemented surfaces, a light source for each binocular type instrument, an illuminating lens for each light source, reflecting prisms for directing light rays from each of said light sources into said binocular type instruments where they are reflected by said inclined prism faces of said pair of glass prism elements and projected through said opening in the direction of said operation the image rays of said operation being projected through said opening and reflected downwardly by said upwardly divergent inclined reflecting surfaces toward said reflecting base surfaces in outward directions and toward said binocular-type instruments.

References Cited by the Examiner

UNITED STATES PATENTS

| 2,435,299 | 2/48 | Weiskopf | 88—24 |
| 2,765,702 | 10/56 | Sachtleben | 88—39 |
| 2,830,494 | 4/58 | Bouwers et al. | 88—29 |
| 2,901,942 | 9/59 | Tackaberry | 88—39 |
| 2,967,458 | 1/61 | Stone | 88—39 |

DAVID H. RUBIN, *Primary Examiner.*